US011321111B2

(12) United States Patent
de Lara et al.

(10) Patent No.: US 11,321,111 B2
(45) Date of Patent: May 3, 2022

(54) ALLOCATION OF GRAPHICS PROCESSING UNITS FOR VIRTUAL MACHINES

(71) Applicants: HUAWEI TECHNOLOGIES CO., LTD., Guangdong (CN); THE GOVERNING COUNCIL OF THE UNIVERSITY OF TORONTO, Toronto (CA)

(72) Inventors: Eyal de Lara, Toronto (CA); Daniel Kats, Toronto (CA); Graham Allsop, Toronto (CA); Weidong Han, Guangdong (CN); Feng Xie, Guangdong (CN)

(73) Assignees: Huawei Technologies Co., Ltd., Shenzhen (CN); The Governing Council of the University of Toronto, Toronto (CA)

( * ) Notice: Subject to any disclaimer, the term of this patent is extended or adjusted under 35 U.S.C. 154(b) by 0 days.

(21) Appl. No.: 16/330,295

(22) PCT Filed: Sep. 5, 2016

(86) PCT No.: PCT/CN2016/098137
§ 371 (c)(1),
(2) Date: Mar. 4, 2019

(87) PCT Pub. No.: WO2018/040112
PCT Pub. Date: Mar. 8, 2018

(65) Prior Publication Data
US 2019/0213032 A1 Jul. 11, 2019

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC . G06F 9/455; G06F 9/46; G06F 9/461; G06F 9/48; G06F 9/50; G06F 9/45533;
(Continued)

(56) References Cited

U.S. PATENT DOCUMENTS

2009/0089815 A1* 4/2009 Manczak ............ G06F 9/45533
719/327
2009/0119684 A1* 5/2009 Mahalingam ....... G06F 9/45558
719/324

(Continued)

FOREIGN PATENT DOCUMENTS

CN 102402462 A 4/2012
CN 102521012 A 6/2012
(Continued)

OTHER PUBLICATIONS

Min Xu et al. ReTrace: Collecting Execution Trace with Virtual Machine Deterministic Replay, In Proceedings of the 3rd Annual Workshop on Modeling, Benchmarking and Simulation, MoBS 2007 (8 pages) XP55596894.

(Continued)

*Primary Examiner* — Charles M Swift
(74) *Attorney, Agent, or Firm* — Slater Matsil, LLP

(57) ABSTRACT

The present disclosure provides systems, methods, and computer-readable media for managing graphics processing unit (GPU) allocation for a virtual machine (VM). A first GPU driver, associated with a first GPU, is offloaded from an operating system (OS) of the VM. Then, the first GPU is deallocated from the VM. A second GPU is allocated to the VM, and a second GPU driver, associated with the second (Continued)

GPU, is loaded in the OS of the VM. To restore a GPU context from the first GPU within the second GPU, a GPU command log from the first GPU is replayed to the second GPU.

20 Claims, 10 Drawing Sheets

(51) Int. Cl.
  *G06F 9/50* (2006.01)
  *G06F 9/46* (2006.01)
  *G06F 9/54* (2006.01)
  *G06F 9/4401* (2018.01)

(52) U.S. Cl.
  CPC ............... *G06F 9/46* (2013.01); *G06F 9/461* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/50* (2013.01); *G06F 9/5005* (2013.01); *G06F 9/5027* (2013.01); *G06F 9/5061* (2013.01); *G06F 9/5077* (2013.01); *G06F 9/5083* (2013.01); *G06F 9/5088* (2013.01); *G06F 9/54* (2013.01); *G06F 9/4411* (2013.01); *G06F 2009/4557* (2013.01); *G06F 2009/45575* (2013.01); *G06F 2009/45579* (2013.01)

(58) Field of Classification Search
  CPC ....... G06F 9/45558; G06F 2009/45575; G06F 2009/45579; G06F 9/4806; G06F 9/4843; G06F 9/485; G06F 9/4881; G06F 9/5005; G06F 9/5061; G06F 9/5077; G06F 9/5083; G06F 9/5088
  See application file for complete search history.

(56) References Cited

U.S. PATENT DOCUMENTS

| | | |
|---|---|---|
| 2011/0084973 A1 | 4/2011 | Masood |
| 2011/0102443 A1* | 5/2011 | Dror .................. G06F 9/45558 345/522 |
| 2012/0084774 A1 | 4/2012 | Post et al. |
| 2012/0092351 A1* | 4/2012 | Barnes .................. G09G 5/363 345/505 |
| 2012/0254862 A1* | 10/2012 | Dong .................... G06F 9/4856 718/1 |
| 2012/0266165 A1* | 10/2012 | Cen ........................ G06F 9/4856 718/1 |
| 2013/0055254 A1* | 2/2013 | Avasthi ................. G06F 9/5077 718/1 |
| 2013/0091500 A1 | 4/2013 | Earl et al. |
| 2013/0290781 A1 | 10/2013 | Chen et al. |
| 2014/0181806 A1* | 6/2014 | Abiezzi ................. G06F 9/5044 718/1 |
| 2015/0058838 A1* | 2/2015 | Tsirkin ...................... G06F 9/50 718/1 |
| 2015/0067672 A1 | 3/2015 | Mitra |
| 2015/0178883 A1 | 6/2015 | Mckenzie et al. |
| 2016/0071481 A1 | 3/2016 | Chakraborty et al. |
| 2016/0239333 A1 | 8/2016 | Cowperthwaite et al. |
| 2016/0247248 A1 | 8/2016 | Ha et al. |
| 2016/0299773 A1* | 10/2016 | Dong ........................ G06T 1/20 |
| 2016/0314008 A1 | 10/2016 | Han et al. |
| 2017/0004808 A1* | 1/2017 | Agashe ..................... G06F 3/14 |

FOREIGN PATENT DOCUMENTS

| | | |
|---|---|---|
| CN | 103034524 A | 4/2013 |
| CN | 105242957 A | 1/2016 |
| CN | 105830026 A | 8/2016 |
| JP | 2014500535 A | 1/2014 |
| KR | 101401523 B1 | 6/2014 |
| WO | 2015100681 A1 | 7/2015 |

OTHER PUBLICATIONS

Haikun Liu et al. Live Migration of Virtual Machine Based on Full System Trace and Replay, HPDC'09, Jun. 11-13, 2009, pp. 101-110. XP58200237.

European Patent Office, Extended European Search Report for Appl. No. 16914677.6 dated Jun. 26, 2019 (9 pages).

ISA/CN, International Search Report and Written Opinion for International Appl. No PCT/CN2016/098137 dated Jun. 1, 2017 (11 pages).

* cited by examiner

ALLOCATION OF GRAPHICS PROCESSING UNITS FOR VIRTUAL MACHINES

TECHNICAL FIELD

The present disclosure relates generally to virtual machine management, and more specifically to techniques for allocating graphics processing units to virtual machines.

BACKGROUND OF THE ART

Virtualization is a technique for running one or more isolated user-space instances called a virtual machine (VM) on a host computing system. A particular host computing system may run multiple VMs at any given time. Each VM is allocated a respective amount of computing resources, including processor cycles, memory, and the like, to run a particular operating system (OS) on hardware allocated to the VM and is configured to execute a particular set of software.

During use, the host computing system is transparent to the user of the VM, and the VM may be used to run any suitable number of applications. In certain instances, a VM may run one or more graphically-intensive or particularly parallelized applications, which may benefit from access to a graphics processing unit (GPU). While a standalone computer (i.e., non-VM) may interface directly with various hardware components, a VM is typically provided with either virtualized hardware, or with an interface, for example a hypervisor, through which the OS of the VM may access certain hardware elements.

VM techniques which provide GPU access to a VM through a hypervisor are flexible, as, in the event of a migration, the hypervisor can redirect communications destined for the original GPU to another GPU. However, hypervisor-based GPU access for VMs typically results in severe performance limitations. An alternative technique, called GPU passthrough, assigns one or more GPU resources to a VM by bypassing the hypervisor or other interfaces and runs a driver for the GPU within the OS of the VM. However, GPU passthrough is much less flexible, for example regarding migration of a VM from one host to another.

As such, there is a need for providing VMs with access to GPU resources with both the flexibility of interfaced GPU access and the performance of GPU passthrough.

SUMMARY

The present disclosure provides systems, methods, and computer-readable media for managing graphics processing unit (GPU) allocation for a virtual machine (VM). A first GPU driver, associated with a first GPU, is offloaded from an operating system (OS) of the VM. Then, the first GPU is deallocated from the VM. A second GPU is allocated to the VM, and a second GPU driver, associated with the second GPU, is loaded in the OS of the VM. To restore a GPU context from the first GPU within the second GPU, a GPU command log from the first GPU is replayed to the second GPU.

In accordance with a broad aspect, there is provided a method for managing graphics processing unit (GPU) allocation for a virtual machine (VM), comprising machine (VM), comprising: offloading a first graphics processing unit (GPU) driver, associated with a first GPU, from an operating system (OS) of the VM; deallocating the first GPU from the VM; allocating a second GPU to the VM; loading a second GPU driver, associated with the second GPU, in the OS of the VM; and replaying a GPU command log from the first GPU to the second GPU to restore a GPU context from the first GPU within the second GPU.

In some embodiments, the method further comprises recording the GPU command log for the first GPU by logging at least one GPU API command with a shadow library.

In some embodiments, logging the at least one GPU API command with the shadow library comprises logging the at least one GPU API command via a user mode driver.

In some embodiments, logging the at least one GPU API command with the shadow library comprises logging the at least one GPU API command via a kernel mode driver.

In some embodiments, the method further comprises migrating the VM from a first host to a second host.

In some embodiments, the first GPU is associated with the first host and the second GPU is associated with the second host.

In some embodiments, the first and second GPU are associated with a common host.

In some embodiments, at least one of the first and second GPU are associated with a GPU bank external to a host of the VM.

In some embodiments, replaying a GPU command log for the second GPU comprises replaying at least one GPU command previously determined to affect future frames.

In some embodiments, at least one of the first and second GPU is a virtualized GPU.

According to another broad aspect, there is provided a system for managing GPU allocation for a VM. The system comprises a processing unit and a non-transitory memory communicatively coupled to the processing unit and comprising computer-readable program instructions. The program instructions are executable by the processing unit for offloading a first graphics processing unit (GPU) driver, associated with a first GPU, from an operating system (OS) of the VM; deallocating the first GPU from the VM; allocating a second GPU to the VM; loading a second GPU driver, associated with the second GPU, in the OS of the VM; and replaying a GPU command log from the first GPU to the second GPU to restore a GPU context from the first GPU within the second GPU.

In some embodiments, the computer-readable program instructions are further executable by the processing unit for recording the GPU command log from the first GPU by logging at least one GPU API command with a shadow library.

In some embodiments, logging the at least one GPU API command with the shadow library comprises logging the at least one GPU API command via a user mode driver.

In some embodiments, logging the at least one GPU API command with the shadow library comprises logging the at least one GPU API command via a kernel mode driver.

In some embodiments, the computer-readable program instructions are further executable by the processing unit for migrating the VM from a first host to a second host.

In some embodiments, the first GPU is associated with the first host and the second GPU is associated with the second host.

In some embodiments, the first and second GPU are associated with a common host.

In some embodiments, at least one of the first and second GPU are associated with a GPU bank external to a host of the VM.

In some embodiments, replaying a GPU command log for the second GPU comprises replaying at least one GPU command previously determined to affect future frames.

In some embodiments, at least one of the first and second GPU is a virtualized GPU.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Graphics processing units (GPU) are increasingly used both for graphics-intensive computer applications and in fields of computing which require high levels of parallelization, such as cryptography. That said, in many settings, for example offices or labs, users access computer resources via a virtualized user-space instance, or a virtual machine (VM), instead of having user-assigned hardware. In order to provide access to high-performance GPU resources for VM users while maintaining flexibility around mobility of the VMs and of the GPU resources, a method for managing GPU allocation for a VM is proposed. The method allows for dynamic migration of VMs and dynamic reallocation of GPU resources in a GPU-passthrough virtualization setting.

Figure 1:
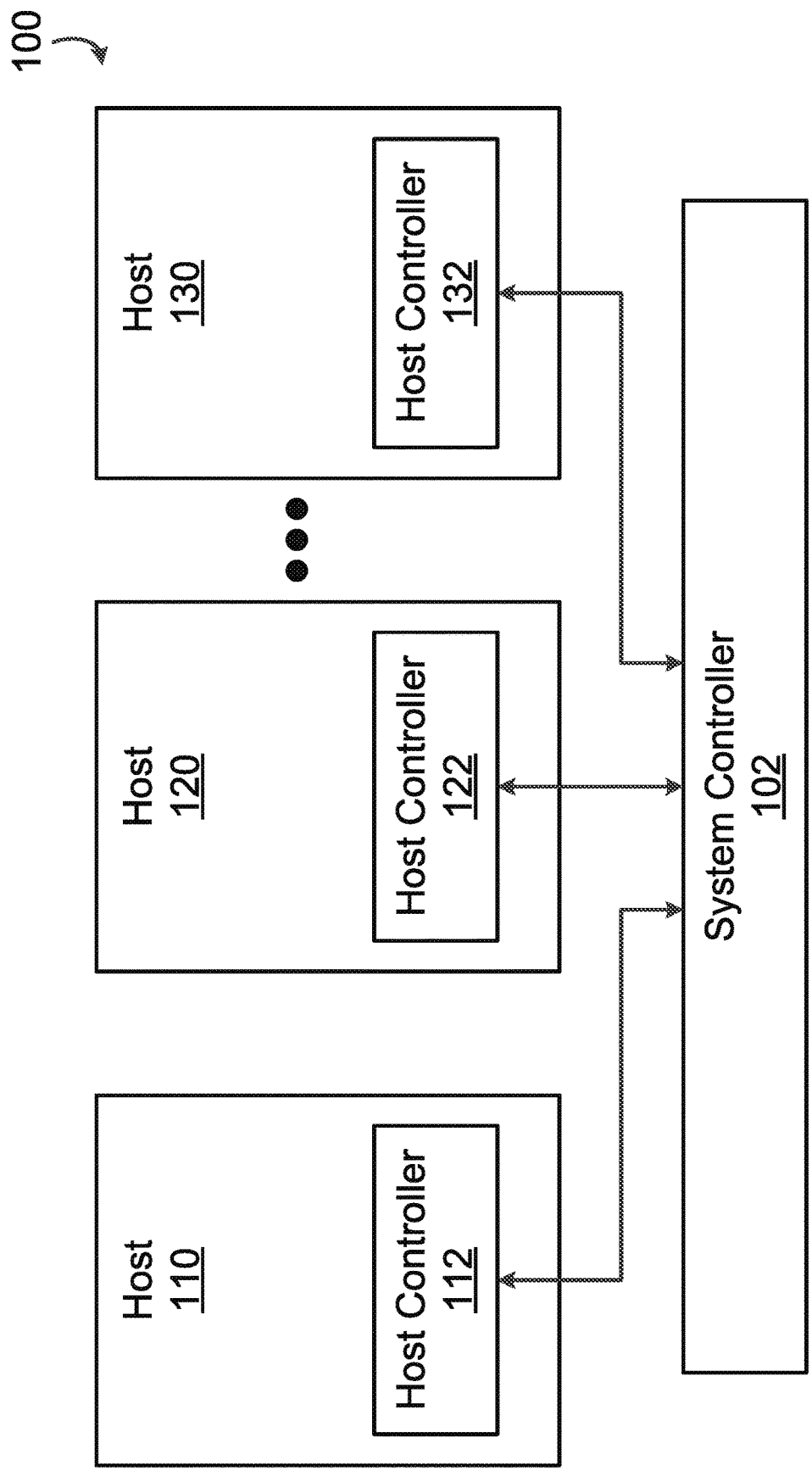
FIG. 1 is a block diagram of an example VM management system.

With reference to FIG. 1, a generalized VM management system 100 is shown. The VM management system 100 has a system controller 102, and includes one or more host machines 110, 120, 130, which together may be referred to as a cluster. Each host 110, 120, 130, has a respective host controller 112, 122, 132, and is communicatively coupled to the system controller 102 via the host controllers 112, 122, 132. While FIG. 1 illustrates a cluster of three hosts, 110, 120, 130, the cluster may comprise any number of host machines. The VM management system 100 may be used in various settings, including offices, laboratories, and the like, in order to provide computing resources to a variety of users.

Figure 2:
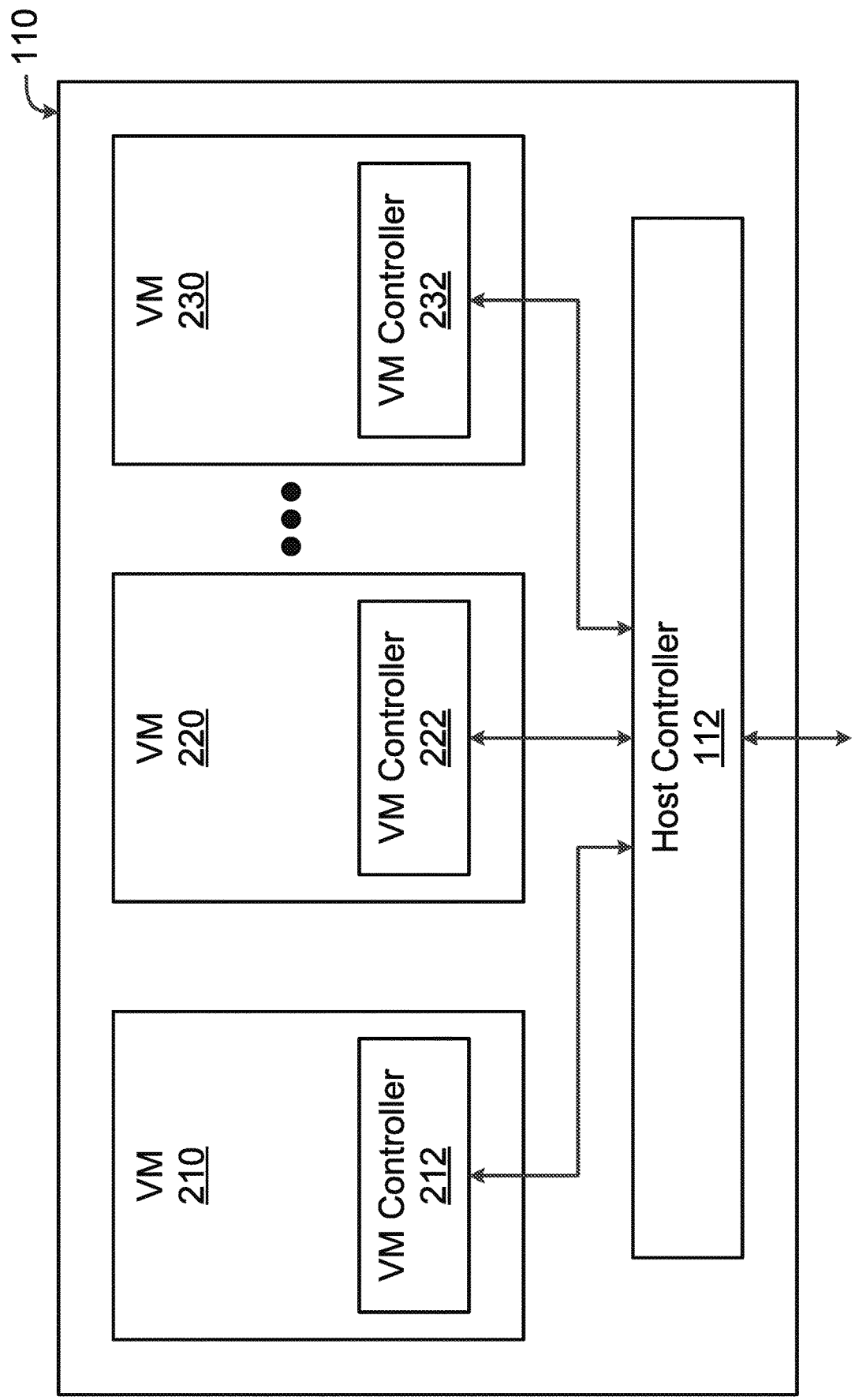
FIG. 2 is a block diagram of an example host machine of FIG. 1.

With reference to FIG. 2, the host 110 may support one or more VMs 210, 220, 230, each having a respective VM controller 212, 222, 232. The VM controllers provide a communication interface for their respective VMs with the host controller 112. The VMs 210, 220, 230 may be provided with any suitable computer resources, including physical hardware and virtualized hardware, and may be used by one or more users to execute one or more applications. In some embodiments, the VMs 210, 220, 230 are accessed by users via workstations assigned to the users, which are configured to receive input from the user, for example from a keyboard, mouse, microphone, gamepad, etc., and to provide output to the user, for example images via one or more screens, sound via one or more speakers, force feedback or vibration via a gamepad or joystick, and the like. For example, the VMs 210, 220, 230 render a plurality of graphical elements, forming a plurality of frames, for presentation to respective users. In another example, the VMs 210, 220, 230 perform various general purpose calculations. In a further example, the VMs 210, 220, 230 are configured for performing both rendering of graphical elements and general purpose computations.

Figure 3:
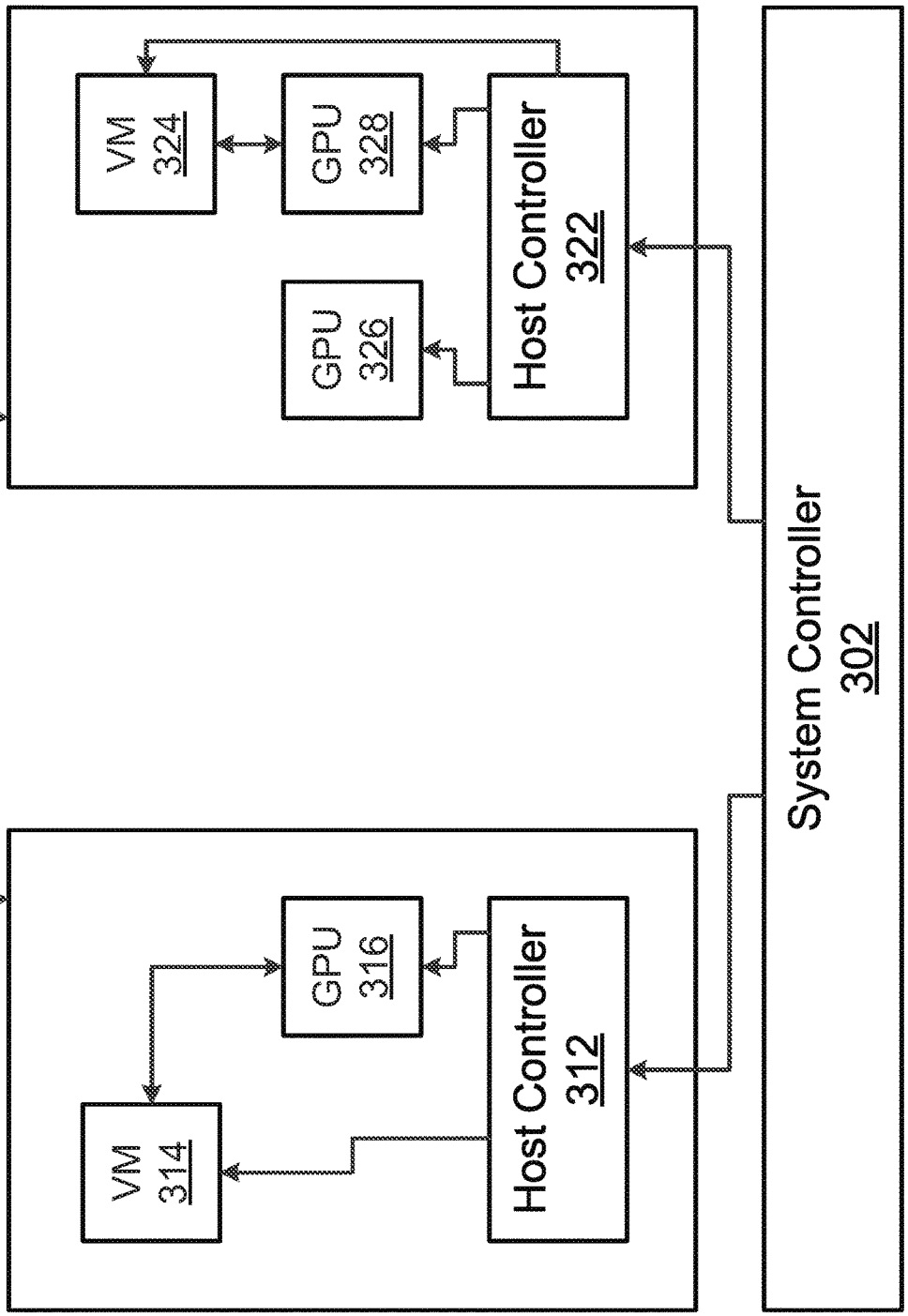
FIG. 3 is a block diagram of an embodiment of the VM management system of FIG. 1.

In a particular embodiment, and with reference to FIG. 3, a VM management system 300 comprises a system controller 302 and two hosts 310 and 320. The first host 310 has a host controller 312 which manages a GPU 316. The first host 310 also hosts a VM 314, to which is assigned the GPU 316. Similarly, the second host 320 has a host controller 322 which manages two GPUs 326 and 328. The second host 320 also hosts a VM 324, to which is assigned the GPU 328. The VMs 314 and 324 may execute one or more applications, and in some embodiments execute one or more graphically-intensive applications which make use of the resources of GPUs 316, 328. While FIG. 3 illustrates two hosts 310, 320, each having one VM 314, 324, and illustrates the first host as having one GPU 316 and the second host as having two GPUs 326, 328, it should be understood that the VM management system 300 may include any number of hosts, and each host may host any number of VMs and may have any number of GPUs.

Figure 4:
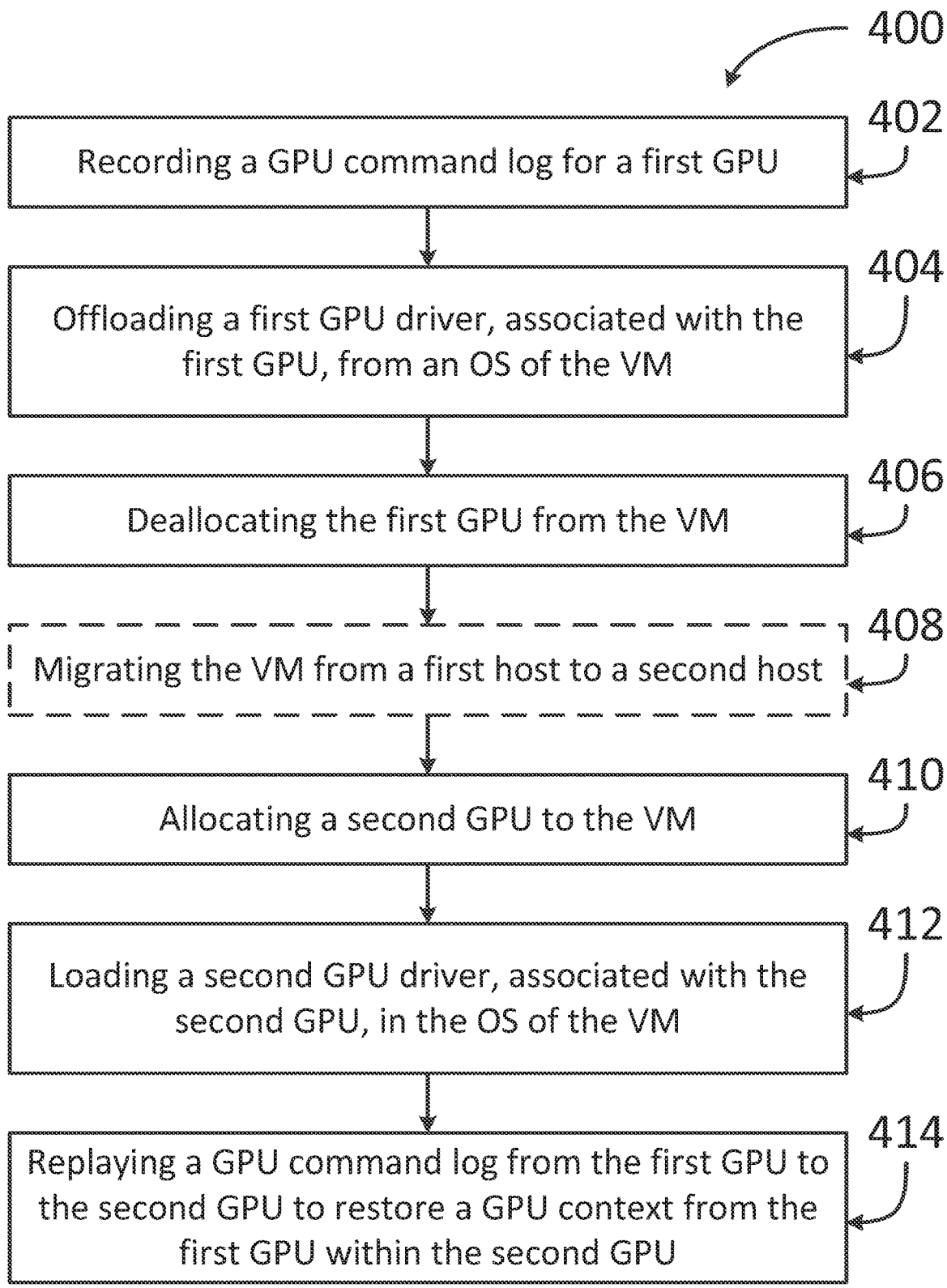
FIG. 4 is a flowchart of a method for managing GPU allocation for a VM in accordance with an embodiment.

Under certain circumstances, there may be a need for the VM management system 300 to perform one or more management tasks regarding the allocation of the GPUs 316, 328, to the VMs 314, 324, for example if VM 314 is to be migrated to a different host, or if VM 324 requires additional GPU resources. The management task can be performed in a fashion transparent to any applications running on VM 314, that is to say, without causing termination of the applications and without the applications noticing any change in GPU resource. To this end, and with reference to FIG. 4, there is provided a method 400 for managing GPU allocation for a VM. The VM is hosted by a first host, and is allocated a first GPU: for example, the VM may be VM 314 hosted in host 310 and allocated GPU 316. In order to use the GPU 316, the VM 314 runs an OS and has a driver for the GPU 316 loaded therein. The method 400 can be used to perform the VM management tasks in a manner that is transparent to applications running At step 402, a GPU command log for the first GPU is recorded. The GPU command log may be continuously recorded, or may be recorded punctually, for example in response to a trigger or signal. In some embodiments, the signal is be indicative of a need to perform maintenance on the first host and/or on the first GPU. In some other embodiments, the signal indicates that a consolidation of hosts is being performed, and that certain hosts are being shut down or transitioned to a lower power state. In still other embodiments, the signal indicates that the VM requires additional, or less, graphics processing power, or that the VM is being migrated. Still further triggers or signals may cause the GPU command log to be recorded for the first GPU.

The GPU command log is used to record one or more GPU application programming interface (API) commands sent from the OS of the VM to the first GPU. The GPU command log may record any number of GPU API commands suitable for maintaining a context of the first GPU. The GPU API may be DirectX®, OpenGL®, or any other suitable GPU API for processing graphics or other visuals. Alternatively, or in addition, the GPU API may be Cuda®, OpenCL®, or any other suitable GPU API for general purpose GPU (GPGPU) computations. The GPU API commands may be recorded, for example, by way of a shadow library, discussed in further detail hereinbelow. The GPU command log may be recorded and stored locally, or may be stored remotely. In some embodiments, the GPU command log stores all GPU API commands. In other embodiments, the GPU command log stores only those GPU API commands which are previously determined to affect the rendering of one or more future frames and/or one or more future calculations.

At step 404, the first GPU driver, associated with the first GPU, is offloaded from the OS of the VM. The offloading of the first GPU driver is performed, for example, by the OS of the VM. By offloading the first GPU driver, the OS and the VM can no longer send commands to the first GPU. In some embodiments, the offloading of the first GPU driver is done in response to a trigger or signal, which may be received from a VM controller of the VM, or from any other suitable source.

At step 406, the first GPU is deallocated from the VM. The deallocation of the first GPU is performed, for example, by a host controller of the first host on which the VM is hosted. Once deallocated, the first GPU may be available for allocation to any other suitable VM, and is no longer associated with the VM. In some embodiments, the first GPU is external to the host of the VM, for example in a GPU bank, which may be accessible to one or more hosts, and the deallocation may be performed by an entity exterior to the first host, for example a system controller.

Optionally, at step 408, the VM is migrated from the first host to a second host. With continued reference to FIG. 3, the second host, for example, is the host 320. Thus, in some embodiments, the first and second hosts are part of a common cluster and are managed by a common system controller. Alternatively, the first and second hosts are part of different clusters. The migration may be performed in any suitable way and by any suitable entities, for example by the host controllers of the first and second hosts and/or by the system controller(s) of the first and second hosts.

At step 410, a second GPU is allocated to the VM, and at step 412, a second GPU driver, associated with the second GPU, is loaded in the OS of the VM. The allocation and loading steps may be performed in any suitable manner. In some embodiments, the first and second GPUs may be from different vendors. In other embodiments, the first and second GPUs may be from the same vendor. Additionally, as stated above, the first and second GPUs may be actual hardware GPUs, or may be virtualized.

At step 414, the GPU command log from the first GPU is replayed to the second GPU to restore a GPU context from the first GPU to the second GPU. The GPU command log is replayed by the OS of the VM to replicate the recorded GPU API commands, so that the second GPU is provided with all the information which was present in the first GPU.

Thus, the second GPU is provided with the entire graphical context which was present in the first GPU, allowing the second GPU to substantially seamlessly provide GPU processing for the VM although it is newly allocated to the VM. This allows the method 400 to manage GPU allocation for a VM in a manner transparent to any applications running on the VM. In other words, the applications do not need to be terminated in order for the method 400 to be executed. In some embodiments, the method 400 is substantially performed between the renderings of two subsequent visual frames: a previous frame is rendered by the first GPU, and once rendered, steps 404 through 414 are performed, such that a subsequent frame is rendered by the second GPU using the GPU context restored at step 414. In some further embodiments, the method 400 is substantially performed at a suitable time in a general purpose calculation, for example between the execution of two subroutines or sets of subroutines.

Figure 5A:
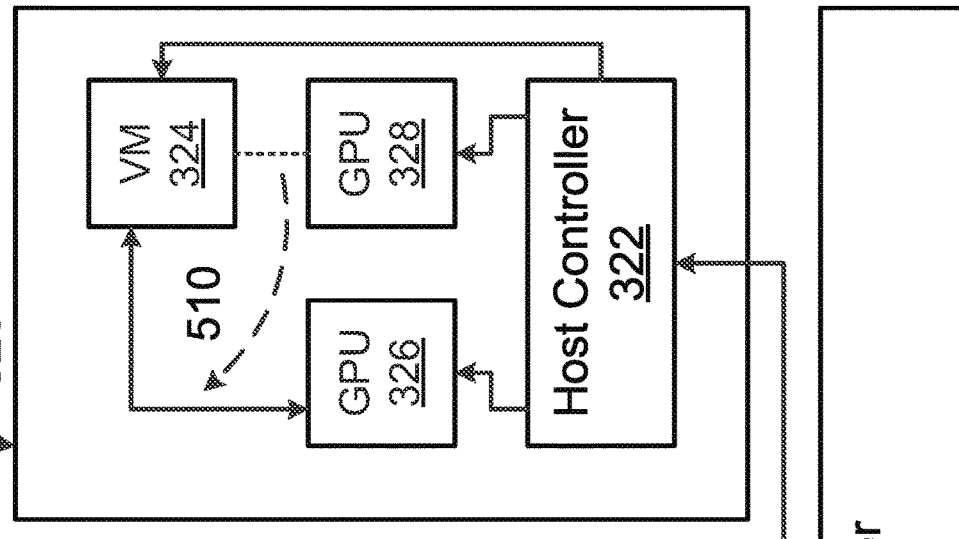
FIGS. 5A-D are block diagrams of various embodiments of the VM management system of FIG. 3.

With reference to FIGS. 3 and 5A, in a first example embodiment of the method 400, the VM in question is VM 324, hosted in host 320. As per FIG. 3, VM 324 is originally allocated GPU 328. Following the method 400, the driver for GPU 328 is offloaded from the OS of VM 324, and GPU 328 is deallocated from VM 324. Then, as illustrated by arrow 510, VM 324 is allocated GPU 326, and a driver for GPU 326 is loaded into the OS of VM 324. The GPU command log is then replayed for GPU 326 to restore the GPU context from GPU 328 to GPU 326, which allows VM 324 to substantially seamlessly swap from GPU 328 to GPU 326. For example, this particular implementation of the method 400 is performed following an indication that the VM 324 requires a different level of GPU resources. Alternatively, this particular implementation is performed following an indication that maintenance is to be performed on GPU 328.

Figure 5B:
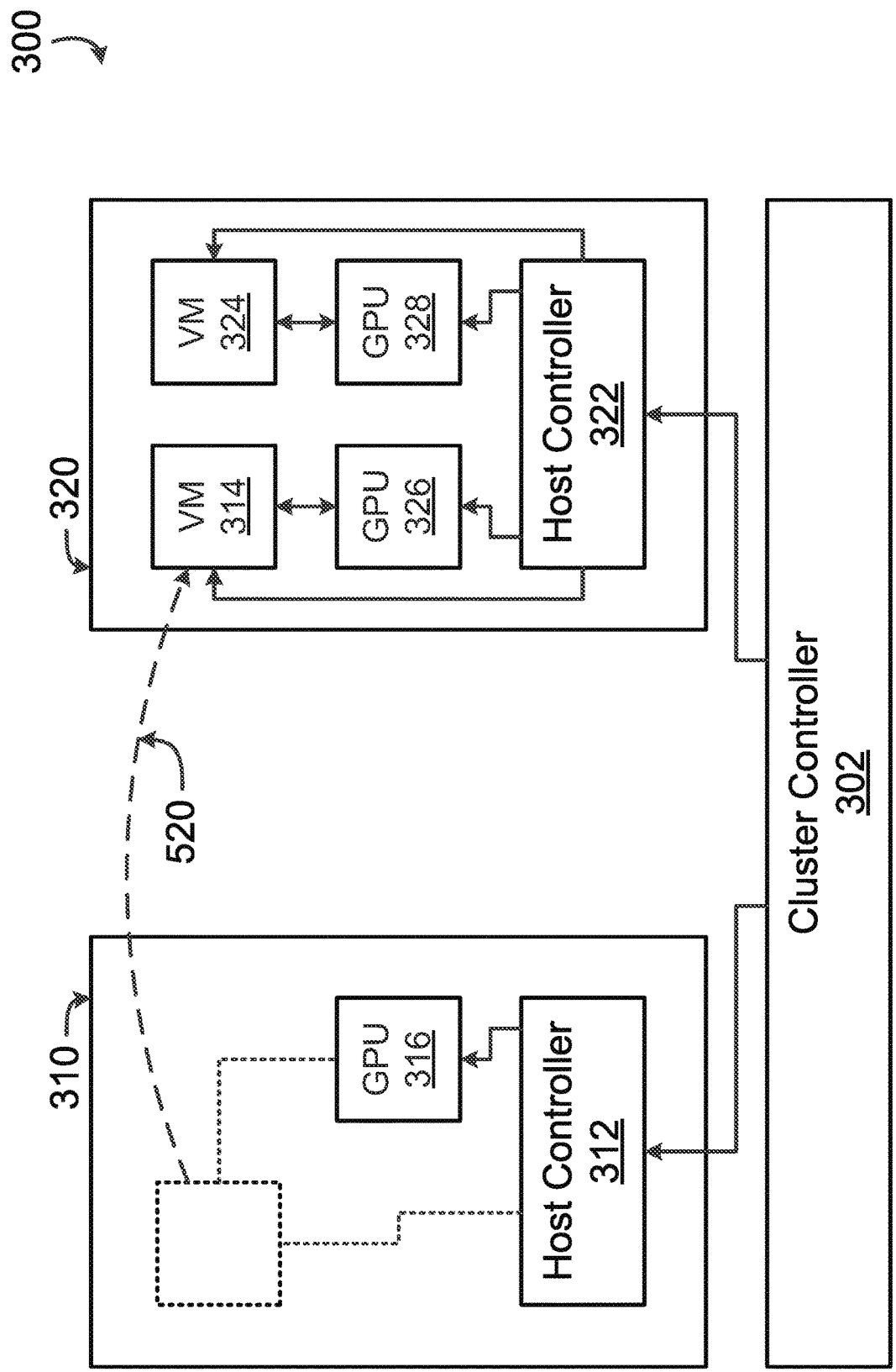

With reference to FIGS. 3 and 5B, in a second example embodiment of the method 400, the VM in question is VM 314, hosted in host 310. As per FIG. 3, VM 314 is originally allocated GPU 316. Following the method 400, the driver for GPU 316 is offloaded from the OS of VM 314, and GPU 316 is deallocated from VM 314. Then, as illustrated by arrow 520, VM 314 is migrated to host 320, is allocated GPU 326, and a driver for GPU 326 is loaded into the OS of VM 314. The GPU command log is then replayed for GPU 326 to restore the GPU context from GPU 316 to GPU 326, which allows VM 314 to substantially seamlessly swap from GPU 316 to GPU 326. For example, the implementation of FIG. 5B is performed following an indication that maintenance is to be performed on the host 310, or following an indication that the VMs of the host 310 are being consolidated into the host 320, for example in order to reduce operating costs.

Figure 5C:
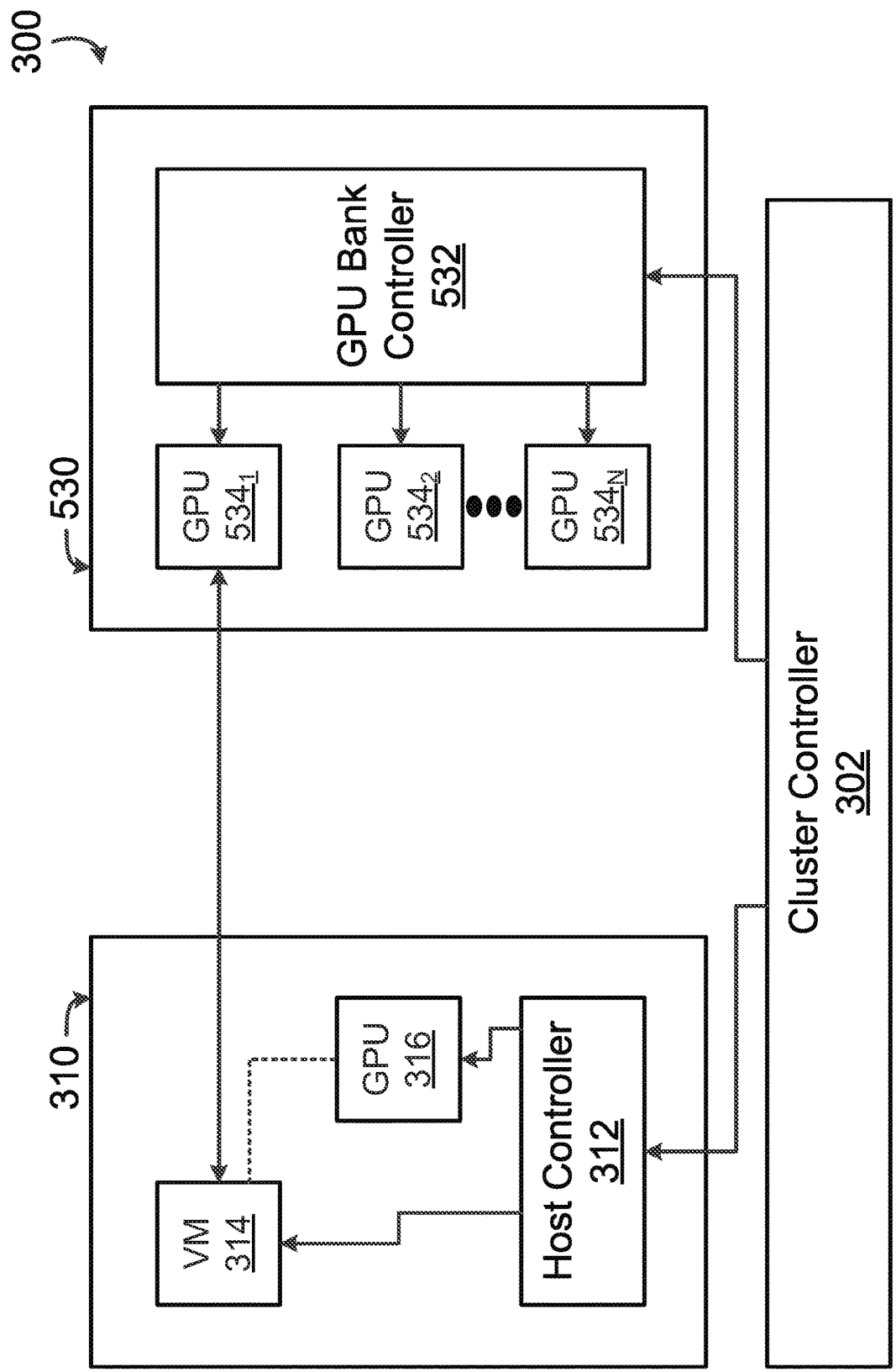

With reference to FIGS. 3 and 5C, in a third example embodiment of the method 400, the VM in question is VM 314, hosted in host 310. As per FIG. 3, VM 314 is originally allocated GPU 316. Following the method 400, the driver for GPU 316 is offloaded from the OS of VM 314, and GPU 316 is deallocated from VM 314. Then, the VM 314 is allocated GPU $534_1$ in GPU bank 530, and a driver for the GPU $534_1$ is loaded in the OS of the VM 314. The GPU command log is then replayed for GPU $534_1$ to restore the GPU context from GPU 316 to GPU $534_1$, which allows VM 314 to substantially seamlessly swap from GPU 316 to GPU $534_1$. The GPU bank may be located in the same cluster as the host 310, or may be located external thereto.

Figure 5D:
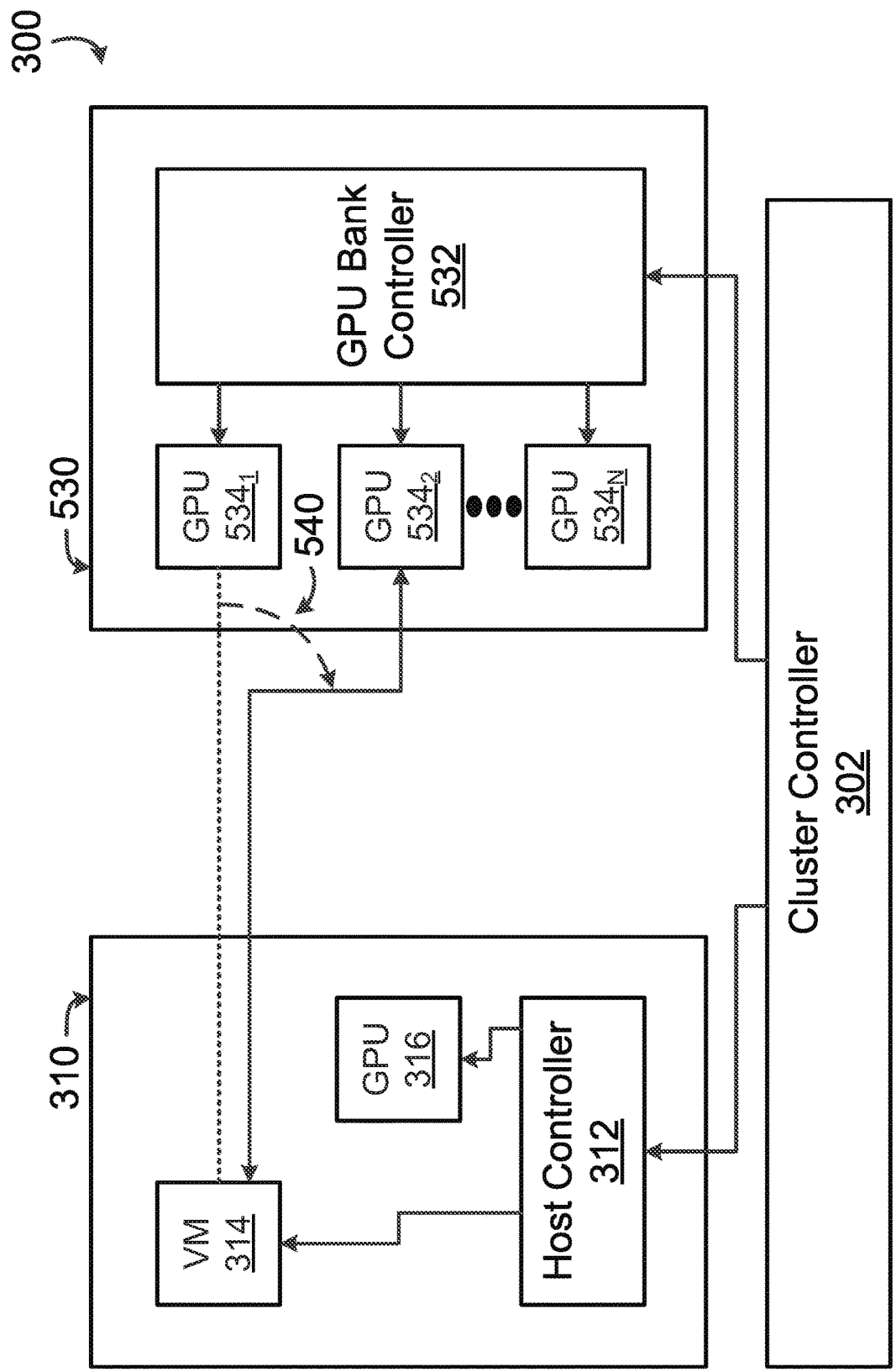

With reference to FIG. 5D, in a fourth example embodiment, the method 400 is applied to the VM 314 of FIG. 5C to swap the GPU $534_1$ for the GPU $534_2$, as illustrated by the arrow 540. This can be performed, for example, if the GPUs $534_1$ and $534_2$ offer different levels of GPU resources and the GPU $534_2$ better matches the requirements of the VM 314. Thus, the driver for the GPU $534_1$ can be offloaded from the OS of the VM 314, and the GPU $534_1$ can be deallocated from the VM 314. Then, the GPU 534$_2$ is allocated to the VM 314, and an associated driver is loaded in the OS of the VM 314. The GPU command log is then replayed for GPU 534$_2$ to restore the GPU context from GPU 534$_1$ to GPU 534$_2$, which allows VM 314 to substantially seamlessly swap from GPU 534$_1$ to GPU 534$_2$.

Still other applications of the method 400 are considered. For example, the embodiment depicted in FIG. 5C may also be performed in reverse, or a VM may swap from a GPU in a first GPU bank to a GPU in a second GPU bank. In some cases, a GPU may be shared between multiple hosts, and assigned to one or more VMs from any of the hosts amongst which it is shared.

Figure 6:
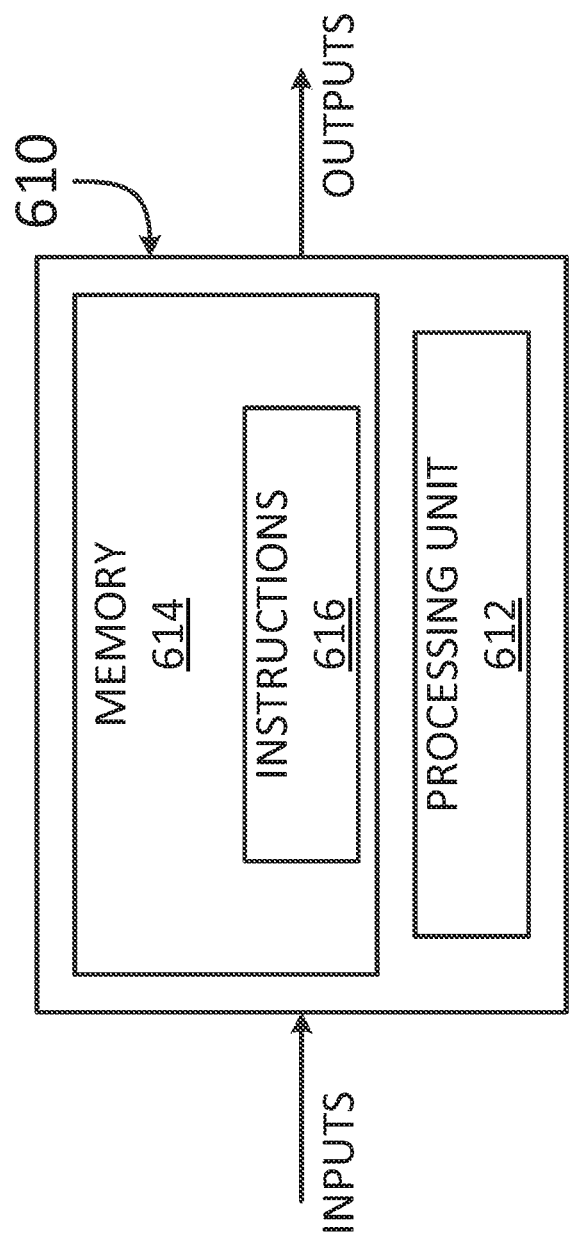
FIG. 6 is a block diagram of an example computer system for implementing a VM management system.

With reference to FIG. 6, the method 400 may be implemented by a computing device 610, comprising a processing unit 612 and a memory 614 which has stored therein computer-executable instructions 616. The processing unit 612 may comprise any suitable devices configured to cause a series of steps to be performed so as to implement the method 400 such that instructions 616, when executed by the computing device 610 or other programmable apparatus, may cause the functions/acts/steps specified in the methods described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

In some embodiments, the computing device 610 may communicate with other computing devices in various ways, including directly and indirectly coupled over one or more networks. The networks are capable of carrying data. The networks can involve wired connections, wireless connections, or a combination thereof. The networks may involve different network communication technologies, standards and protocols, for example Global System for Mobile Communications (GSM), Code division multiple access (CDMA), wireless local loop, WiMAX, Wi-Fi, Bluetooth, Long Term Evolution (LTE) and so on. The networks may involve different physical media, for example coaxial cable, fiber optics, transceiver stations and so on. Example network types include the Internet, Ethernet, plain old telephone service (POTS) line, public switched telephone network (PSTN), integrated services digital network (ISDN), digital subscriber line (DSL), and others, including any combination of these. The networks can include a local area network and/or a wide area network.

Figure 7:
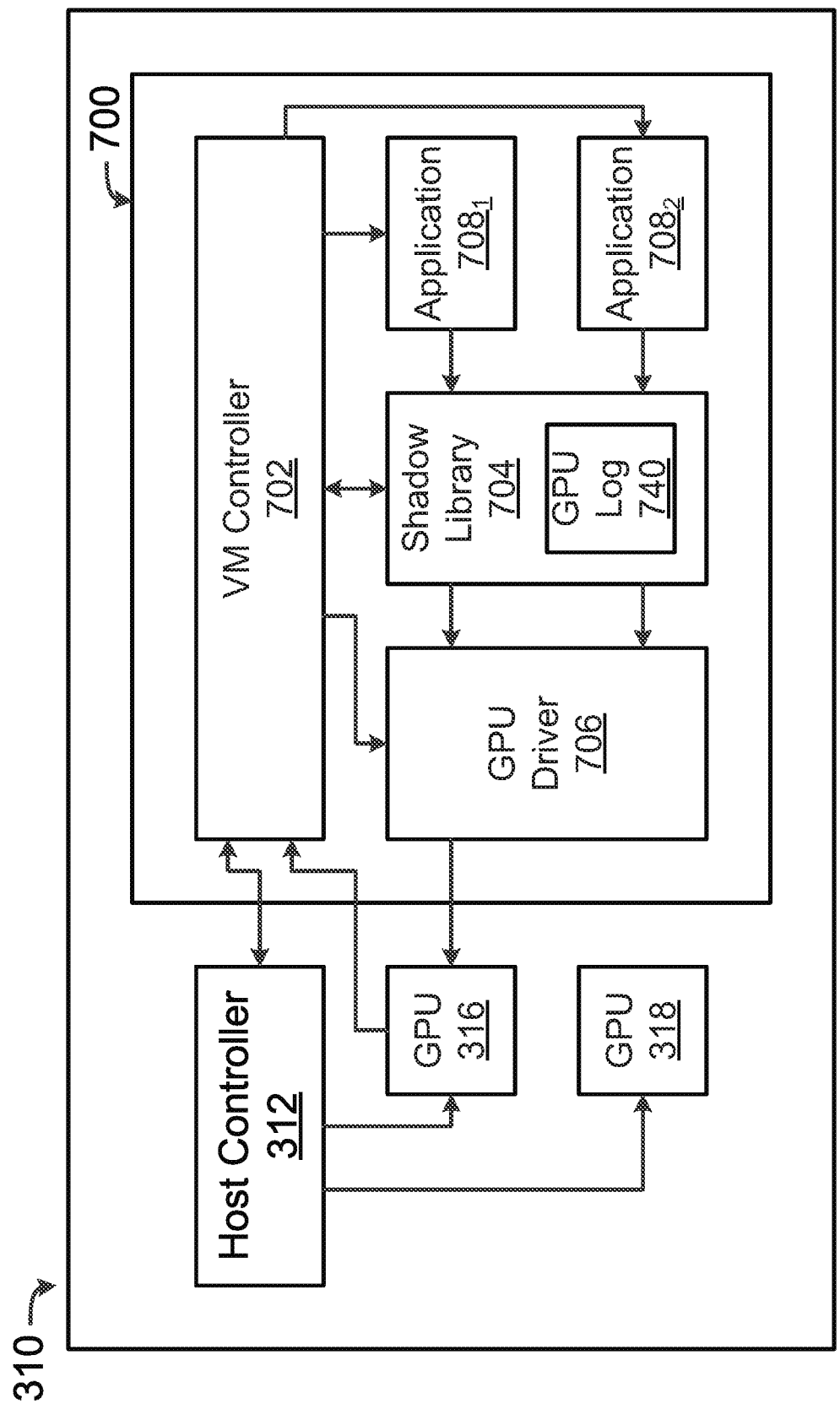
FIG. 7 is a block diagram of an example system for implementing the method of FIG. 4.

With reference to FIG. 7, there is shown an example VM 700, which is hosted on host 310. The VM 700 has a VM controller 702 configured for interfacing with the host controller 312 and with the GPU 316. In some embodiments, the VM controller 702 implements the OS of the VM 700. The VM 700 may run one or more applications 708$_1$, 708$_2$, which may send one or more GPU API commands to a GPU driver 706. The GPU API commands may be sent via a shadow library 704, which may log one or more of the GPU API commands in a GPU log 740.

The VM controller 702 is configured for interfacing with the host controller 312. The host controller 312 may send one or more signals to the VM controller 702 indicating that a GPU management task is to be implemented, for example to migrate VM 700, or to assign VM 700 a different GPU. Alternatively, or in addition, the VM controller 702 may send one or more signals to the host controller 312 requesting migration of the VM 700, or requesting a different level of GPU resources for the VM 700. In some embodiments, upon receiving and/or sending one or more GPU management task-related signals, the VM controller 702 instructs the shadow library 704 to begin logging GPU API commands in preparation, as per step 402. In other embodiments, the shadow library 704 is logging GPU API commands in a substantially continuous fashion, and the VM controller need not instruct the shadow library to begin logging the GPU API commands.

The VM controller 702 is also configured for offloading the GPU driver 706, as per step 404, for example by causing the OS of the VM 700 to offload the GPU driver 706. In some embodiments, the VM controller 702 sends a signal to the host controller 312 to indicate whether the GPU driver 706 has been successfully offloaded. If the VM controller 702 fails to offload the GPU driver 706, the VM controller 702 may request that the host controller 312 not proceed with further steps of the method 400 until the GPU driver is successfully offloaded.

The host controller 312 is configured for deallocating the GPU 316 from the VM 700, as per step 406. In some embodiments, the host controller 312 mediates or assists in part or all of the optional migration of the VM 700 from the host 310 to a second host, for example host 320 in FIG. 3. The migration of the VM 700 may also be mediated and/or performed by a system controller, for example the system controller 302 of FIG. 3, as per step 408.

The host controller 312 (or equivalent in another host, if step 408 is performed) is also configured for allocating a second GPU, for example GPU 318, to the VM 700, as per step 410, and the VM controller 702 is configured for loading a driver for the second GPU in the OS of the VM 700, as per step 412. The allocation and loading steps may be performed in any suitable fashion, for example as mirrors of the deallocation and offloading processes performed in steps 406 and 404, respectively.

The shadow library 704 is configured for intercepting the GPU API commands sent by the applications 708$_1$, 708$_2$ and for retransmitting the GPU API commands to the GPU driver 706. Thus, the shadow library 704 is substantially transparent to the applications 708$_1$, 708$_2$ and to the GPU driver 706, but receives substantially all the GPU API commands sent to the GPU driver 706. This allows the shadow library 704 to log the GPU API commands in the GPU log 740, as per step 402, which can be used to restore the GPU context after a GPU swap has been performed, as per step 414. In some embodiments, the GPU driver 706 comprises at least one native library for providing graphic APIs for the applications, such as OpenGL® Shared Library and OpenCL® Shared Library. The shadow library 704 may dynamically load the native library and obtain the handle of the GPU API through a "dlopen" function or another similar function, then forward the intercepted GPU API commands to the GPU hardware. Further, in some embodiments, a new function named "mydlopen" may be created for the shadow library 704, and the address of the "mydlopen" function is included in the GOT (global offset table) entry of the "dlopen" function. Therefore, the shadow library 704 can call the dlopen function and record the handle of the library that has been loaded using the created "mydlopen" function.

The shadow library 704 may intercept the GPU API commands via a user mode driver or a kernel mode driver, depending on the security settings of the OS of the VM 700. The shadow library 704 may be a plurality of shadow libraries, for example one shadow library for each GPU library compatible with the OS of the VM 700, and each shadow library 704 has a respective GPU log 740. For example, a VM 700 capable of running applications $708_1$, $708_2$ which output GPU API commands for both DirectX® and OpenGL libraries has two shadow libraries 704. In another example, a VM 700 capable of running applications $708_1$, $708_2$ which output GPU API commands for both OpenCL and Cuda® libraries has two shadow libraries 704. The VM 700 can also include any suitable combination of shadow libraries 704.

In some embodiments, the shadow library 704 substantially continuously logs all GPU API commands issued by the applications $708_1$, $708_2$. In some other embodiments, the shadow library 704 logs all GPU API commands, but only after receipt of instructions to do so from, for example, the VM controller 702. In still other embodiments, the shadow library logs only those GPU API commands determined to affect future frames, either substantially continuously, or in response to instructions. The GPU API commands determined to affect future frames may be GPU API commands previously known to affect future frames, for example based on a lookup table, or the shadow library 704 may perform this determination itself using any suitable means.

The system for managing GPU allocation and/or the method 400 described herein may be implemented in a high level procedural or object oriented programming or scripting language, or a combination thereof, to communicate with or assist in the operation of a computer system, for example the computing device 610. Alternatively, the system for managing GPU allocation and/or the method 400 may be implemented in assembly or machine language. The language may be a compiled or interpreted language. Program code for implementing the system for managing GPU allocation and/or the method 400 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the system for managing GPU allocation and/or the method 400 may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Various aspects of the system for managing GPU allocation herein-disclosed may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

What is claimed is:

1. A method comprising:
   while a first graphics processing unit (GPU) driver is running in a virtual machine (VM), recording in a GPU command log commands sent to a first GPU associated with the first GPU driver;
   in response to a trigger to dynamically reallocate GPU resources in a system:
   offloading, from an operating system (OS) of the VM, the first GPU driver, wherein the offloading of the first GPU driver is controlled by a VM controller in the VM;
   deallocating the first GPU from the VM in a GPU-passthrough virtualization setting in which a GPU assigned to the VM bypasses a hypervisor;
   allocating a second GPU to the VM in the GPU-passthrough virtualization setting;
   loading, by the VM controller in the VM, a second GPU driver, associated with the second GPU, in the OS of the VM; and
   following the offloading, the deallocating, the allocating, and the loading, replaying the GPU command log recorded for the first GPU to the second GPU to restore a GPU context from the first GPU within the second GPU in the GPU-passthrough virtualization setting.

2. The method of claim 1, wherein recording the commands in the GPU command log comprises recording at least one GPU application programming interface (API) command with a shadow library.

3. The method of claim 2, wherein recording the at least one GPU API command with the shadow library comprises recording the at least one GPU API command via a user mode driver or a kernel mode driver.

4. The method of claim 1, further comprising:
   receiving, by the VM controller from a host controller that manages the first GPU, an indication that a different GPU is to be assigned to the VM,
   wherein the trigger comprises the indication from the host controller.

5. The method of claim 4, further comprising:
   sending, by the VM controller in the VM, a signal to the host controller of a host in which the VM executes, the signal indicating whether the first GPU driver has been successfully offloaded.

6. The method of claim 1, further comprising migrating the VM from a first host to a second host, wherein the first GPU is associated with the first host, and the second GPU is associated with the second host.

7. The method of claim 1, wherein the first GPU is separate from the second GPU.

8. The method of claim 1, wherein the first GPU and the second GPU are associated with a common host.

9. The method of claim 1, wherein at least one of the first GPU or the second GPU is associated with a GPU bank external to a host of the VM.

10. The method of claim 1, further comprising:
determining which GPU command of a plurality of GPU commands sent by the OS of the VM affects a rendering of a future frame; and
recording, in the GPU command log, the GPU command determined to affect the rendering of the future frame.

11. The method of claim 1, wherein at least one of the first GPU and the second GPU is a virtualized GPU.

12. The method of claim 1, further comprising:
receiving, by the VM controller, an instruction indicating that a different GPU is to be assigned to the VM, wherein the trigger comprises the instruction; and
in response to receiving the instruction, instructing, by the VM controller, a shadow library to record the commands in the GPU command log.

13. A system comprising:
a processing unit; and
a non-transitory memory communicatively coupled to the processing unit and comprising computer-readable program instructions executable by the processing unit to:
while a first graphics processing unit (GPU) driver is running in a virtual machine (VM), record in a GPU command log commands sent to a first GPU associated with the first GPU driver;
in response to a trigger to dynamically reallocate GPU resources in the system:
offload, from an operating system (OS) of the VM, the first GPU driver, wherein the offloading of the first GPU driver is controlled by a VM controller in the VM;
deallocate the first GPU from the VM in a GPU-passthrough virtualization setting in which a GPU assigned to the VM bypasses a hypervisor;
allocate a second GPU to the VM in the GPU-passthrough virtualization setting;
load, using the VM controller, a second GPU driver, associated with the second GPU, in the OS of the VM; and
following the offloading, the deallocating, the allocating, and the loading, replay the GPU command log recorded for the first GPU to the second GPU to restore a GPU context from the first GPU within the second GPU in the GPU-passthrough virtualization setting.

14. The system of claim 13, the computer-readable program instructions being further executable by the processing unit to:
receive, at the VM controller from a host controller that manages the first GPU, an indication that a different GPU is to be assigned to the VM,
wherein the trigger comprises the indication.

15. The system of claim 13, the computer-readable program instructions being further executable by the processing unit to migrate the VM from a first host to a second host, wherein the first GPU is associated with the first host and the second GPU is associated with the second host.

16. The system of claim 13, wherein the first GPU is separate from the second GPU.

17. The system of claim 13, wherein the first GPU and the second GPU are associated with a common host.

18. The system of claim 13, wherein at least one of the first GPU or the second GPU is associated with a GPU bank external to a host of the VM.

19. The system of claim 13, the computer-readable program instructions being executable by the processing unit to:
determine which GPU command of a plurality of GPU commands sent by the OS of the VM affects a rendering of a future frame; and
record, in the GPU command log, the GPU command determined by the processing unit to affect the rendering of the future frame.

20. A non-transitory machine-readable storage medium comprising instructions that upon execution cause a system to:
while a first graphics processing unit (GPU) driver is running in a virtual machine (VM), record in a GPU command log commands sent to a first GPU associated with the first GPU driver;
in response to a trigger to dynamically reallocate GPU resources in the system:
offload, from an operating system (OS) of the VM, the first GPU driver, wherein the offloading of the first GPU driver is controlled by a VM controller in the VM;
deallocate the first GPU from the VM in a GPU-passthrough virtualization setting in which a GPU assigned to the VM bypasses a hypervisor;
allocate a second GPU to the VM in the GPU-passthrough virtualization setting;
load, using the VM controller, a second GPU driver, associated with the second GPU, in the OS of the VM; and
following the offloading, the deallocating, the allocating, and the loading, replay the GPU command log recorded for the first GPU to the second GPU to restore a GPU context from the first GPU within the second GPU in the GPU-passthrough virtualization setting.

* * * * *